Sept. 6, 1932. A. C. W. ALDIS 1,875,363
PRODUCTION OF MAPS BY MEANS OF AERIAL PHOTOGRAPHS
Filed March 20, 1930 8 Sheets-Sheet 4

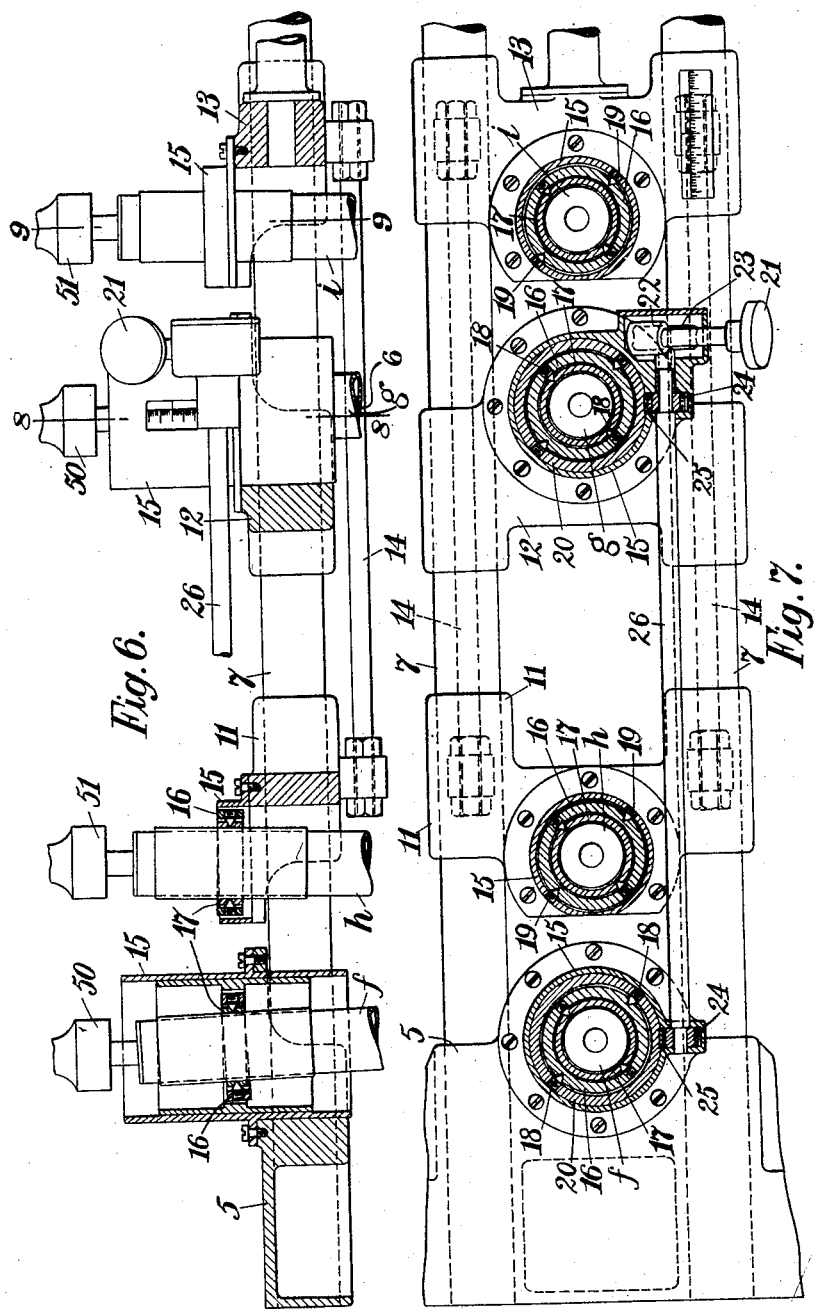

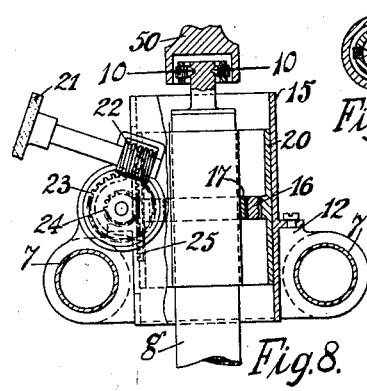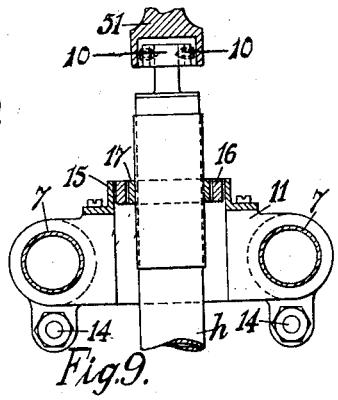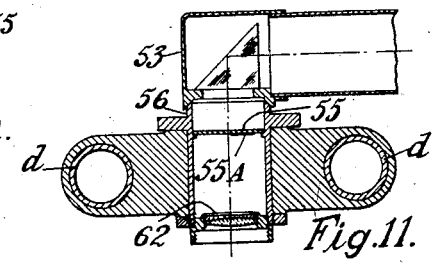

Patented Sept. 6, 1932

1,875,363

UNITED STATES PATENT OFFICE

ARTHUR CYRIL WEBB ALDIS, OF BIRMINGHAM, ENGLAND

PRODUCTION OF MAPS BY MEANS OF AERIAL PHOTOGRAPHS

Application filed March 20, 1930, Serial No. 437,543, and in Great Britain April 10, 1929.

This invention has for its object to enable stereoscopic aerial photographs to be used conveniently in the production of maps, the invention being concerned primarily with the determination of the heights, shapes or contours of the various features shown in the photographs.

The invention depends in part on the following fact. If a pair of photographs, which have been rectified to compensate for tilt of the camera axis, are properly correlated and viewed through a stereoscope, reference marks properly placed in relation to the same object in the two photographs will appear to lie in contact with that object in the stereoscopic view. If the reference marks are displaced from the correct position they will appear in the stereoscopic view as occupying a position above or below the object. The adjustment necessary to bring them into contact can be used for determining the altitude of that position.

Before describing the essential features of my invention, and the procedure to be followed in obtaining from a pair of stereoscopic photographs the required information, I will describe one form of apparatus constructed in accordance with my invention.

In the eight accompanying sheets of explanatory drawings:—

Figure 6 is a side elevation, and Figure 7 a plan showing to a larger scale than Figures 1—3 the means for connecting certain rods to a transversely movable member in my apparatus. Figure 8 is a sectional side elevation (on the line 8—8 Figure 6) showing one of the pivot joints through which the rods pass and Figure 9 is a sectional elevation (on the line 9—9 Figure 6) of the other pivot joint.

Figure 10 is a sectional plan (on the line 10—10 Figures 8 or 9) of the joint used for attaching the upper ends of the said joints to the photograph carrier.

Figure 11 is a sectional elevation showing a part of the optical apparatus by which the photographs are examined.

Figure 11a is a plan of the graticule in the viewing apparatus.

Figure 1:
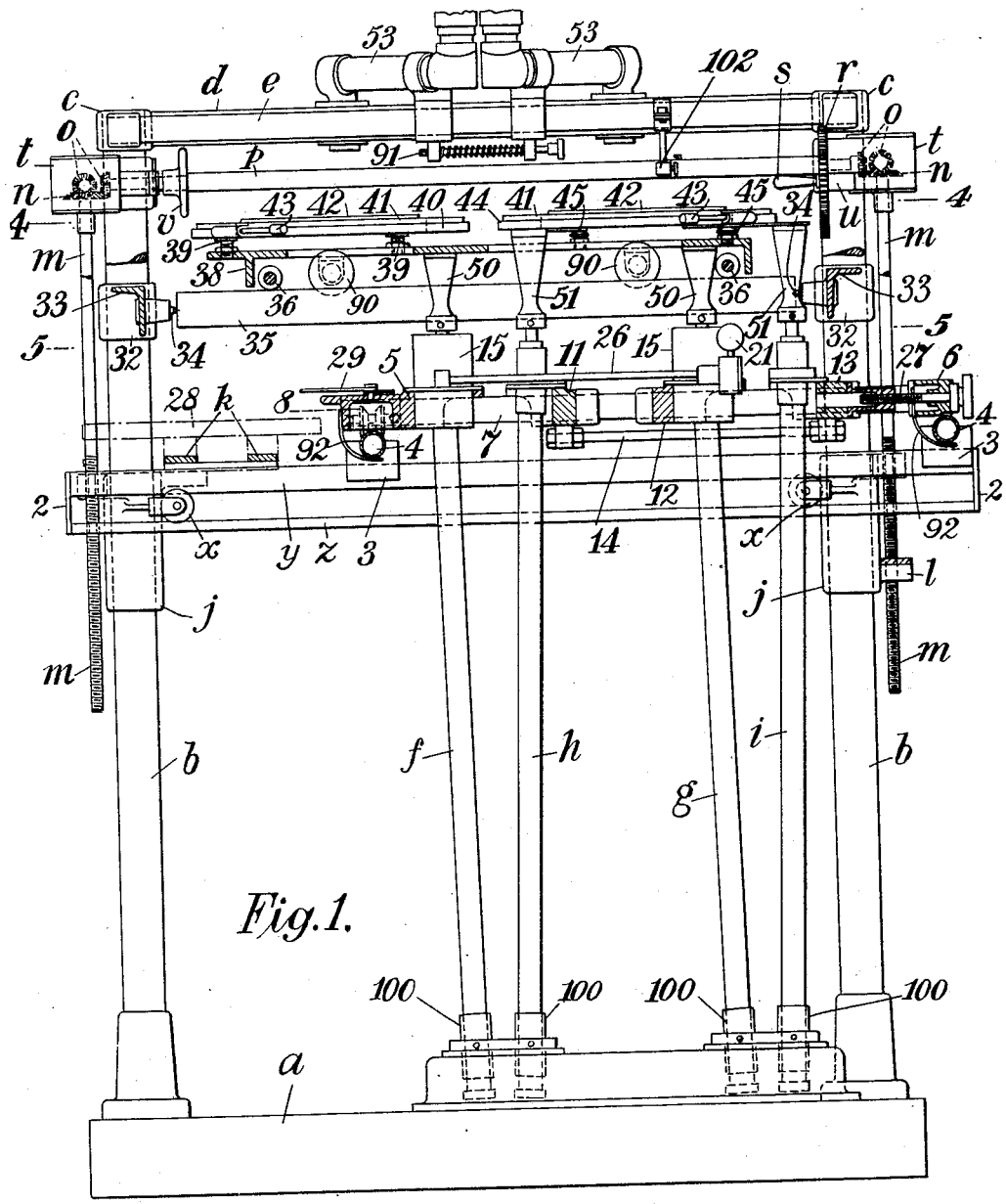
Figure 1 is a front elevation, Figure 2 a side elevation, and Figure 3 a plan of the apparatus.

To a base $a$ there are secured four upright pillars $b$. These are securely interconnected at their upper ends by side bars $c$ and a pair of cross bars $d$. The viewing apparatus to be hereinafter described is carried partly on the bars $d$ and partly on an additional front bar $e$.

On the upright pillars $b$ there are carried two distinct groups of parts, one of the groups containing what is herein termed the contour mechanism, and the other group containing the supports or carriers for the photographs. The two groups of parts are interconnected by rods $f$, $g$, $h$, $i$ which will be described more fully later.

In the contour mechanism there is provided on each of the upright pillars $b$ a sleeve $j$ which can slide on its pillar. The two sleeves at the left hand side of the apparatus are interconnected by a cross bar or bars $k$, and those at the right hand side by a cross bar $l$. Further all four sleeves are interconnected by operating mechanism whereby they can be caused to move simultaneously in vertical direction on the pillars $b$. Such operating mechanism comprises four screws $m$ having secured to their upper ends bevel wheels $n$. These bevel wheels are interconnected by other bevel wheels $o$ and cross shafts $p$. The various bevel wheels are contained in and carried by housings $t$ secured to the pillars $b$. The front cross shaft can be rotated by a pair of toothed wheels $q$, $r$, one of which ($r$) is provided with a handle $s$ and is carried on a bracket $u$ on one of the housings $t$. Also the said shaft can be rotated by a hand wheel $v$. The handle $s$ is used to produce a rapid motion of the mechanism, and the hand wheel $v$ is used to give a fine adjustment. To enable the user to measure the movements given to the sleeves $j$, a graduated scale rod 10 is secured to each of the housings $t$ and arranged to pass through a guide in the corresponding sleeve $j$, the latter being provided with an aperture through which the graduations in the rods can be inspected. By the use of a scale in conjunction with each sleeve, errors due to slight inaccuracies in the mechanism can readily be detected. The amount of movement given to the sleeves $j$ may also be determined by a revolution counting mechanism 102 driven by the front cross shaft, and by an index arranged adjacent to the wheel $v$.

On each of the sleeves $j$ there is carried a roller $x$ formed with a deeply grooved periphery. The rollers at the front of the apparatus carry between them a guide bar $y$ of circular cross section, and the corresponding rollers at the rear of the machine carry a similar bar. Detachment of the bars $y$ from the rollers $x$ is prevented by a guard $z$ which is arranged beneath the rollers and is attached to the bars $y$ by end pieces 2. On the bars $y$ are secured blocks 3 to which are secured transverse bars 4 of tubular or circular cross section. The bars $y$, 4, form a frame which can slide horizontally on the rollers $x$. Above the bars 4 is arranged a movable frame comprising end members 5, 6, and a pair of longitudinal members 7, each of the latter being of circular or tubular cross section. A pair of deeply grooved rollers 8 on the end member 5 engage one of the bars 4, and a pair of cylindrical rollers 9 connected to the member 6 rest on the other bar 4. The frame formed by the members 5, 6, 7, can slide in a horizontal direction on the parts 4. Accidental detachment of this frame from the bars 4 is prevented by guard pieces 92.

In conjunction with the frame formed by the members 5, 6, 7, are arranged four universal pivots for the rods, $f$, $g$, $h$, $i$. One of these pivots is provided on the end member 5 and the others are carried by slides, 11, 12, 13, one of which, 12, is pinned to the bars 7 while the other two, 11 and 13, can slide on them. The slides 11, 13, are interconnected by rods 14, so that they slide together on the rods 7. The inner parts of the pivots connected with 5 and 12 are interconnected so that they move together relatively to the rods $f$, $g$. The construction of the pivots is shown clearly at Figures 6, 7, 8 and 9. Each comprises an outer fixed hollow cylinder 15, containing a pair of gimbal rings 16, 17. One of the rods, $f$, $g$, $h$, or $i$ passes through the inner ring 17, and this is pivoted to the ring 16 by a pair of pivots 18. In the case of the rods, $h$, $i$, the ring 16 is pivoted by pivots 19 to the fixed hollow cylinder 15, but in the case of the rods $f$, $g$, the outer ring 16 is pivoted to an inner slidable bush 20 which can be moved axially within the fixed cylinder 15 by a finger piece 21, worm 22, worm wheel 23, and pinion 24, the latter engaging a rack 25 on the bush 20 (see Figures 7 and 8). The finger piece 21 and its associated mechanism is provided only on the cylinder carried by the part 12, the sliding of the bush in the cylinder on the part 5 being effected by a shaft 26, which connects the pinion 24 to a similar pinion engaging a rack on the bush in the said cylinder on the part 5. The sliding of the parts 11, 13 on the bars 7 is effected by a screw 27 engaging the part 13.

At the left hand side of the apparatus there is also carried on the front sleeve $j$ a table 28 on which is supported the paper on which it is required to plot the contour observed in the photographs, and in combination with the table is arranged a pantagraph 29 one end of which is pivoted on the end member 5 of the contour mechanism; another part of the pantagraph is pivoted at 30 to any convenient portion of the apparatus such as one of the cross bars $k$.

The means employed for carrying the photographs is situated above the contour mechanism, and is carried on the pillars $b$ by sleeves 32, the pairs of sleeves at the two sides of the apparatus being interconnected by cross bars 33. Between the said cross bars there are carried by pivots 34 a pair of roller bars 35, and on these rest another pair of transverse roller bars 36 which are attached at their ends by pivots 37 to the underside of the table 38.

At the left hand side of this table there is fixed by screws 39 a plate 40 on which is carried a rotatable ring 41 on which is placed a photograph 42. The photograph is ordinarily formed on or attached to a glass plate. The ring 41 is rotatable relatively to the plate 40 by a worm which is actuated by a finger piece 43, the worm engaging with teeth around the periphery of the ring 41. The plate 44 at the right hand side of the table is supported on and is slidable horizontally on projections 45 on the table 38. This plate 44 is likewise fitted with a ring 41 which is rotatable by a finger piece 43, and which carries another photograph 42. The photographs are illuminated by lamps 90 placed beneath the table 38.

It will be apparent that the rollers 35 and 36 allow the table 38 to be moved in any direction in a horizontal plane similarly to the contour mechanism. The motion of the table is obtained by a pantagraph mechanism 60 attached to the table at 61 and to one of the pillars $b$, the pantagraph being manipulated by a handle 63.

In order that the motion of the table 38 and of the slidable part of the contour mechanism may be understood, it will now be necessary to describe more fully the rods, $f$, $g$, $h$, $i$. The rods $f$, $g$, form one pair which are parallel with each other, and the rods $h$, $i$, form another pair which are parallel with each other. Each rod is pivotally connected at its lower end to the base $a$ by a universal swivel joint 100 consisting of gimbal rings similar to those shown in Figure 10. These pivots all lie in the same horizontal plane. The rods can also slide axially relatively to the said pivotal joints. The rods $f$, $g$, form one pair and their upper ends are each connected by a universal swivel joint (Figure 10) to a stem 50 secured to the underside of the table 38. The rods $h$, $i$, forming the other pair are likewise attached to stems 51 secured to the underside of the plate 44. At an intermediate position the rods pass through the swivel connections on the contouring mechanism. It will be apparent that the photograph supports and the contour mechanisms are interconnected in a definite relationship by the rods, and any movement of the photographs in a horizontal plane is accompanied by a corresponding movement of the contour mechanism.

Figure 2:
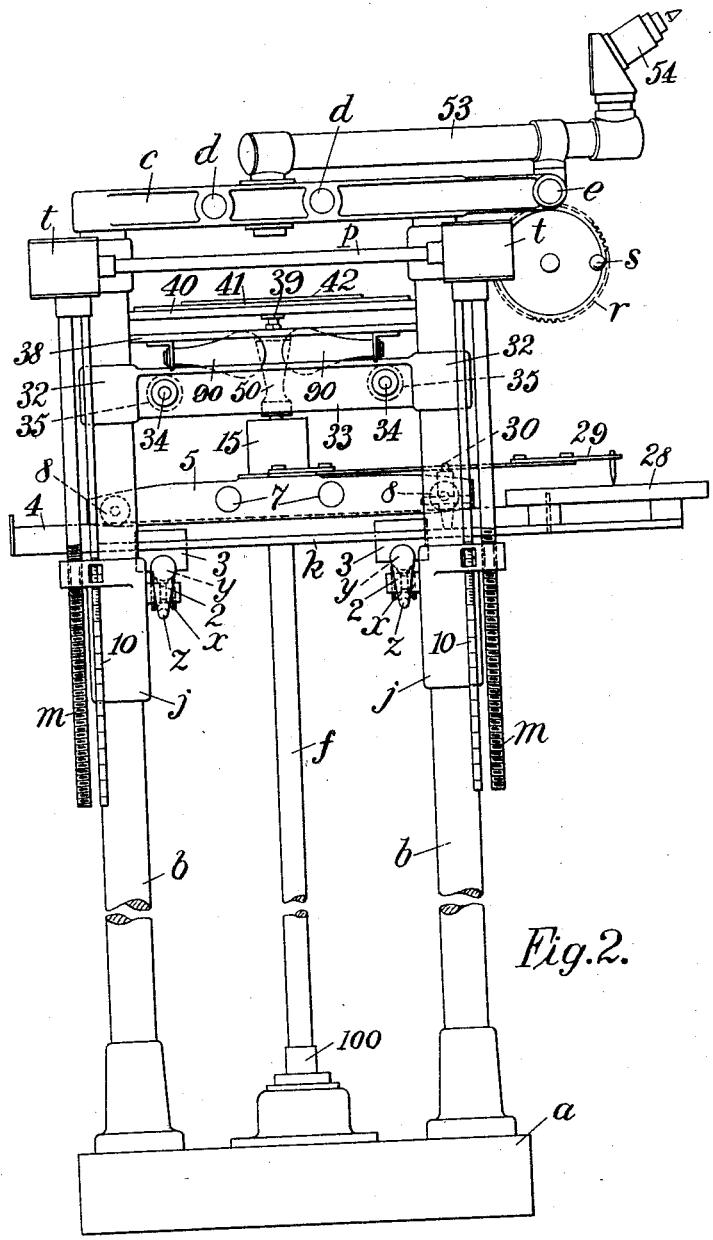
Figure 3:
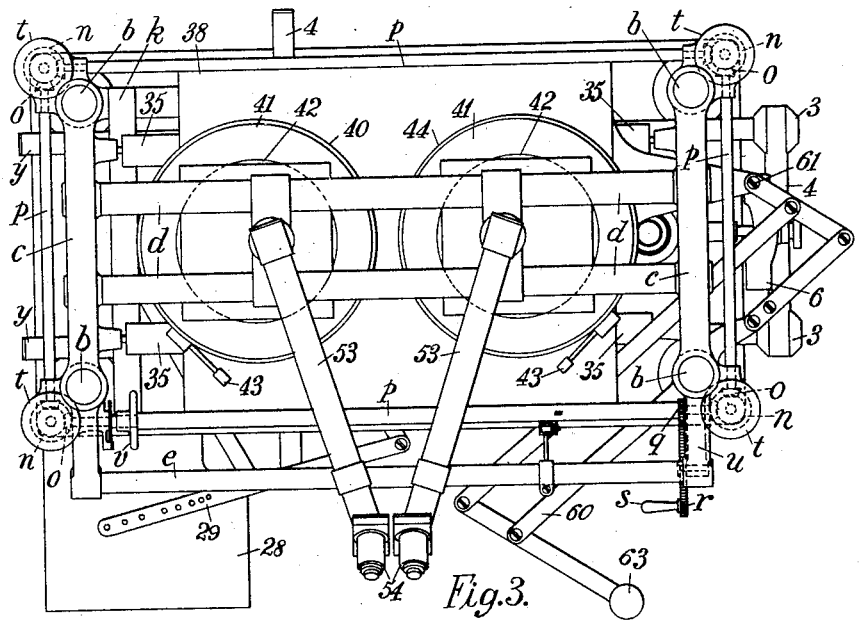
Figure 4:
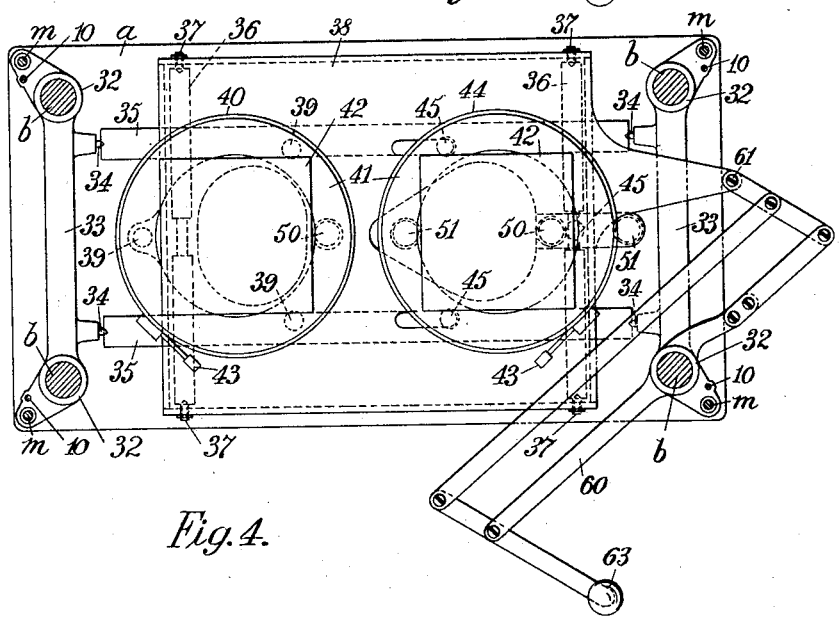
Figures 4 and 5 are respectively sectional plans on the lines 4—4, 5—5, Figure 1.
Figure 5:
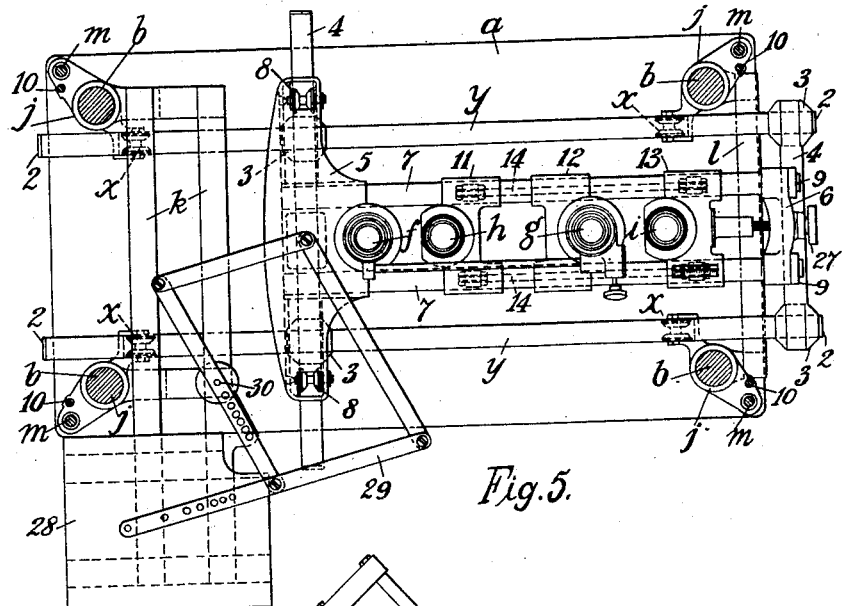

The viewing apparatus situated above the photograph supports comprises a pair of tubes 53 containing appropriate lenses and prisms, the eye-pieces being indicated by 54 (Fig. 2). The tubes 53 are swivelled on the upper ends of tubes 56 each containing an objective 62 and a graticule 55 (Fig. 11). The tubes 53 are adjustable towards or away from each other in a horizontal plane by a screw 91.

It is convenient to arrange the graticules 55 within the tubes 56. The reference marks on the graticule may take any desired form, but a pointer $55^a$ as shown in Figure $11^a$ is found to be most convenient. This tube 56 is rotatable about a vertical axis. The axis of the tube is made accurately vertical, and is rigidly mounted, as this axis is one of the critical axes to be described later the tip of the mark $55^a$ being on this axis.

Figure 12:
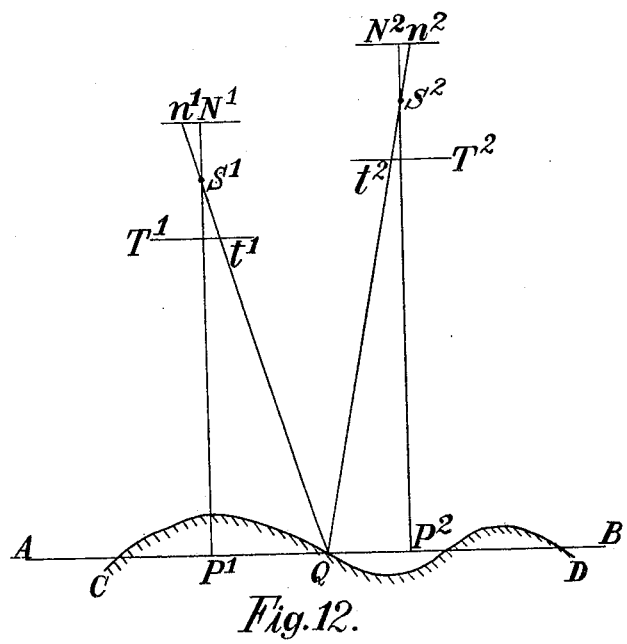
Figures 12 to 16 are diagrams illustrating the principles underlying my invention.

Before describing the manner in which the apparatus is used, it is convenient at this stage to describe the fundamental principles underlying the apparatus. Figure 12 illustrates diagrammatically the principal geometrical conditions which exist when a pair of successive photographs are taken from the air. A B represents a horizontal line on the ground, and the irregular line C D represents a vertical section of a piece of country over which the aeroplane carrying the camera is flying. The vertical axis N' P' corresponds to one position of the camera, and this axis passes through the view point or lens S' of the camera. The negative in the camera is at N'. The line T' represents an imaginary positive photograph or print taken from the negative and placed at such a position that N' S' is equal to T' S'. Likewise $N^2$, $P^2$ represents the vertical axis through the view point $S^2$ of the camera lens at the position where the second photograph is taken, the negative is at $N^2$, and a positive is for the purpose of the diagram placed at $T^2$. In the diagram the view point $S^2$ is shown at a greater height above the ground than S'. This corresponds to the case in which the height of the aeroplane has increased before the second photograph is taken. It will be apparent that both photographs will contain ground detail that is common to both. For example a point Q in the plane A B will appear on both photographs. The line Q, S' will intersect the negative N' at $n'$ (and the imaginary positive photograph at $t'$), whilst the line Q $S^2$ will intersect the negative $N^2$ at $n^2$ (and the imaginary positive photograph at $t^2$).

Figures 13, 14:
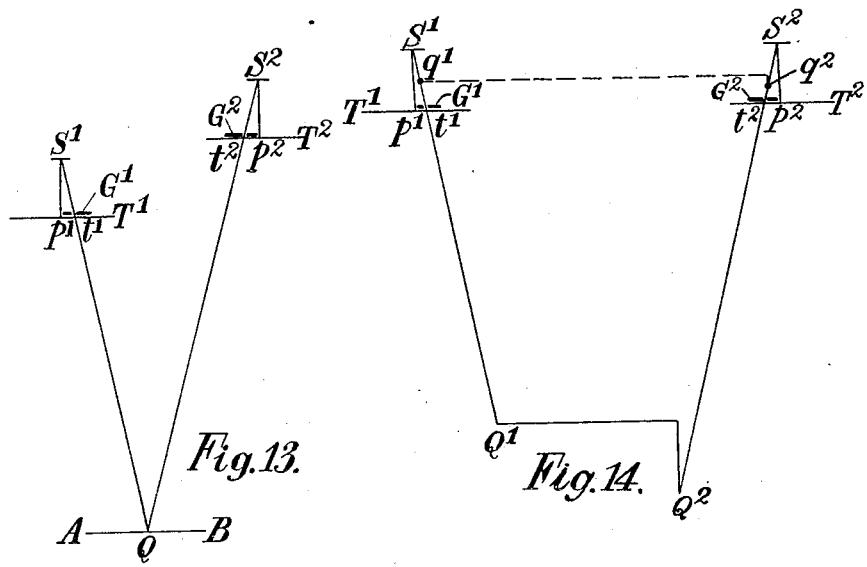

In Figure 13 there is shown a diagram illustrating the essential axes of one form of apparatus made in accordance with my invention. It will be seen that Q S', Q $S^2$ correspond to the lines Q S' Q $S^2$ in Figure 12. The photographs are indicated by T', $T^2$. If these are suitably placed, the line drawn through S' $t'$ will meet the line drawn through $S^2$ $t^2$ at Q. The lines shown in Figure 13 can be regarded as reproducing the conditions shown in Figure 12 on a greatly reduced scale. Although it is not convenient to construct a practical apparatus satisfying the geometrical conditions shown in Figures 13, it is for the purpose of elucidating my invention convenient at this stage to assume that the diagram at Figure 13 does in fact represent the essential axes of a practical form of apparatus. If the photographs at T' $T^2$ are placed with the plumb points $p'$ $p^2$ at focal distance below the points S' $S^2$ and are properly oriented, then when the photographs are viewed stereoscopically the ground detail corresponding to the points $t'$ $t^2$ will appear as a single point in the stereoscopic picture. By plumb point is meant a point on the photograph corresponding to a point on the ground which was vertically beneath the camera when the photograph was taken. If now it be supposed that a movable reference mark (G' $G^2$) be placed on each of such points $t'$ $t^2$, then the said marks will appear in the picture as a single mark in contact with the ground at that point. This condition is satisfied by all points in the horizontal plane through Q corresponding with the intersection of the plane A B with the ground represented by C D, Figure 12. Similarly the distance of the plane through Q from the view points S' $S^2$ (13) corresponds with the distance of the plane A B from the view points S' $S^2$, Figure 12.

In apparatus embodying the conditions shown in Figure 13 it would be necessary to provide (1) stationary supports for the photographs, (2) means for imparting horizontal sliding motions to the plane A B (without rotation), (3) means for moving the reference marks G' $G^2$ relatively to the photographs, so that the axes S' G', and $S^2$ $G^2$ always intersect in a point Q fixed in the movable plane A B.

Whilst Figure 13 represents the geometrical conditions of a possible apparatus, it is more convenient to arrange the photographs in the same horizontal plane, and at a greater distance apart than is necessitated by the arrangement shown in Figure 13. The more convenient arrangement is illustrated at Figure 14. Here the more widely separated photographs $T'$ $T^2$ are in the same horizontal plane, and the axes $S'$ $G'$ $S^2$ $G^2$ meet a horizontally movable body in separated points $Q'$ $Q^2$. The horizontal separation of the points $Q'$ $Q^2$ corresponds to the increased separation of the photographs, and the vertical distance between the points $Q'$ $Q^2$ corresponds to the difference in level of the two photographs $T'$ $T^2$ in Figure 13.

The geometrical conditions shown in Figure 14 can be satisfied by other arrangements of the horizontally movable part containing the points $Q'$ $Q^2$, and I have shown one such arrangement by the dotted lines in Figure 14. A horizontally movable member containing the points $q'$ $q^2$ can be made to control the axes through $S'$ $S^2$ in the same way as the movable member containing the points $Q'$, $Q^2$, provided that the ratio of the vertical distance between $q'$, $q^2$ and the vertical distance between $Q'$ $Q^2$, is the same as the ratio of the vertical distance between $q'$ $S'$ and the vertical distance between $Q'$ $S'$.

Figure 15:
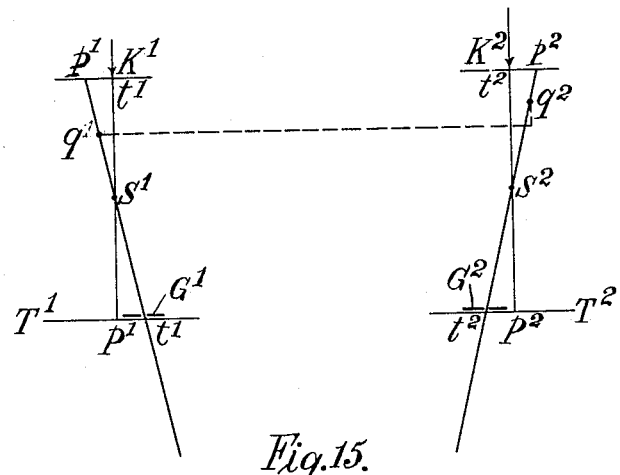

In Figure 14 the photographs $T'$ $T^2$ are assumed to be at the focal distance below the corresponding view points $S'$ $S^2$, but it is evident that the horizontally movable member to which the points $Q'$ $Q^2$ (or $q'$ $q^2$ are attached will still function for determining contours if all the vertical distances shown in the diagrams are proportionately increased, without altering the horizontal distances. In Figure 15 the photographs $T'$ $T^2$ are shown at an increased distance below the points $S'$ $S^2$. It is also possible whilst satisfying the conditions already described to transpose the positions of the photographs relatively to the points $S'$ $S^2$. This is shown in the diagram in Figure 15, and in consequence of this transposition certain important advantages result. It will be seen from an inspection of Figure 15 that the photographs have been translated without rotation from positions below $S'$ $S^2$ to positions at the same distance above the said points. They have also been moved horizontally so that $S'$ $G'$ passes through the plumb point of the photograph, and a fixed vertical axis through $S'$ passes through the ground detail $t'$. In consequence of this re-arrangement the movable reference marks $G'$ $G^2$ are replaced by fixed reference marks $K'$ $K^2$ on the vertical axes through $S'$ $S^2$. Also the photographs instead of being fixed, are arranged to be movable in a horizontal plane, without rotation, so that the axis $S'$ $G'$ passes through the plumb point $p'$ in the one photograph and the axis $S^2$ $G^2$ passes through the plumb point $p^2$ of the other photograph. Further the axes $S'$ $G'$ and $S^2$ $G^2$ can be controlled by a horizontally movable member placed conveniently near the undersides of the photographs and rigidly associated with the points $q'$ $q^2$.

Figure 16:
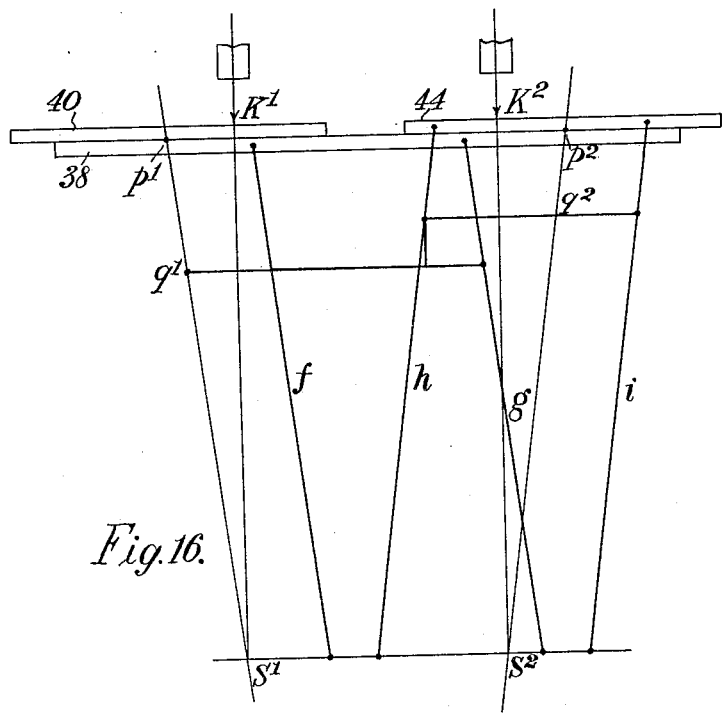

The geometrical conditions which are satisfied by the apparatus shown in Figures 1 to 11, will now be readily appreciated, and these are shown diagrammatically in Figure 16. It will be seen at once that the arrangement of axes shown in Figure 16 corresponds with the upper part of the diagram shown in Figure 15, and similar reference letters are employed to indicate corresponding axes. In addition, there are shown the rods $f$, $g$, which determine the axis $S'$ $q'$ $p'$ and the rods $h$, $i$ determine the axis $S^2$ $q^2$ $p^2$. The support for the photograph is represented by 41, and the position of the contour mechanism is indicated by the heavy lines through $q'$, $q^2$. Whilst the reference marks are shown in Figure 16 at the positions $K'$ $K^2$ it will be understood that they are actually carried, as already described, in the viewing apparatus and are optically projected on to the photographs at the positions $K'$, $K^2$.

I will now proceed to describe the mode of using my apparatus. In the first place a pair of photographs taken in succession in the air are corrected to compensate the effect of tilt of the camera axis. This correction may be effected in the manner, and by means of apparatus, described in my British Patent Specifications Nos. 329,383 and 330,972. On each photograph is marked the plumb point. The first of such corrected photographs is placed on the left hand support 40, and the other on the right hand support 44.

Let it be supposed that the right hand photograph was taken at a height of 1,000 feet above its plumb point. The first adjustment required in the apparatus is to move the contour mechanism to a convenient height above the fixed swivelling centres 100 in the base. A height in which the pivots on the members 11, 13 are 30 inches above the corresponding pivots in the base of the instrument may be regarded as convenient. The dimension 30 inches establishes a scale of vertical heights. Supposing the other photograph to have been taken at a height of 1,020 feet, then it is necessary to move the pivots on the members 5 and 12 so that they occupy a position 0.6 inch higher than the pivots in the members 11, 13 above mentioned. This adjustment is made by the finger piece 21.

Subsequently each photograph is centred so that the plumb point is on the axis of rotation of the supporting plate, and each photograph is oriented so that with one pair of control rods (say $f$, $g$,) vertical the two plumb points of the photographs and their images all lie in a straight line. The operator then by means of the screw 27 adjusts the separation of the two photographs (while keeping $f$, $g$, vertical) until the reference marks as seen through the stereoscope are seen as a single mark apparently in contact with the ground at the plumb point of the left hand photograph. This adjustment will reveal any error of orientation, and such error can be corrected at this stage. The apparatus is now adjusted for obtaining contours at plumb-point level. The operator now by means of the pantagraph handle 63 guides the photographs so that the reference mark as seen in the stereoscope always appears to lie in contact with the ground. This causes the pencil of the pantagraph 29 to draw the contour corresponding to plumb-point level on the map sheet placed on the table 28. The scale of this contour will not be in the ratio 30 inches=1,000 feet, but will be to a smaller scale determined by the ratio of the focal length of the lens used in the photographing camera to the vertical height of the pivots in the parts 50, 51, above the corresponding pivots 100 in the base of the apparatus.

Supposing it is required to plot contours of different levels varying by 10 feet the operator raises the whole of contour mechanism by means of the hand wheel $v$ through a distance of 0.3 inch. This contour is now plotted on the map sheet, the control of the operation being effected by apparent contact of the reference mark with the ground. The above operations are repeated until the whole of the required contours are obtained.

Figure 17:
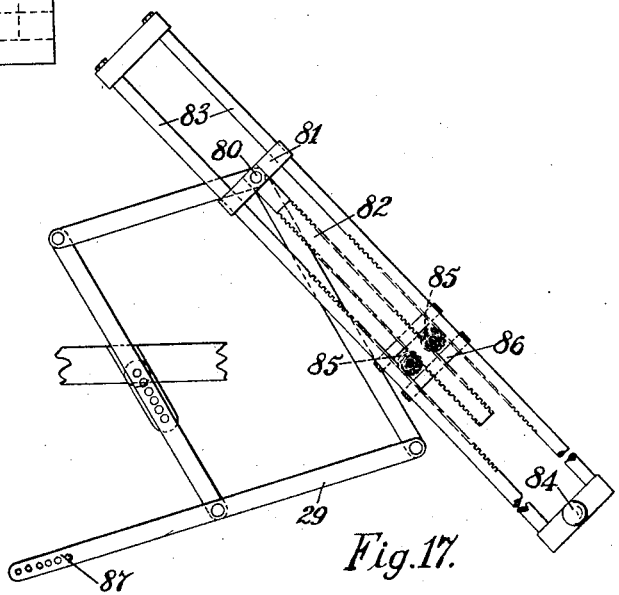
Figure 17 illustrates an alternative pantagraph mechanism for use with my apparatus.

Whilst in the foregoing I have described the preferred form of apparatus embodying my invention, I desire it to be understood that my invention is not limited thereto. Further, the mechanical details of the mechanism shown in Figures 1—11ᵃ can be varied to suit different requirements. For example, instead of using a pantagraph mechanism attached to the photograph carrier for moving the photographs relatively to the viewing instrument, I may impart the required movements to the apparatus by a mechanism arranged in conjunction with the pantagraph of the contour mechanism as shown in Figure 17. On the pivot 80 of the said pantagraph is pivoted a block 81 to which is attached a rod 82 shaped to form a double toothed rack. Also through this block slide a pair of rods 83 which are interconnected at their ends, and provided at one end with a handle 84. Each rod 83 forms a rack engaging the larger of a pair of double pinions 85 mounted on a block 86 which is pivoted on any convenient fixed part of the apparatus. The rods 83 also slide through the block 86. It will be apparent that if a sliding movement is given in one direction to the rods 83, a proportional but reduced and opposite movement is given to the rod 82, and this movement is imparted to the pantagraph 29 as well as to the contour mechanism and the photograph carriers. In such a mechanism the motions of the end 87 of the pantagraph to which the pencil is attached are in all respects similar to the movements given by the operative to the handle 84.

By my invention I am able to determine contours from stereoscopic photographs in a very simple and expeditious manner, and the simple character of the apparatus employed enables the required accuracy to be readily obtained. Furthermore, by this invention I am able to detect readily any errors in the rectification of the photographs, for if the photographs have not been properly rectified it will not be possible to see the reference marks as a single mark, without altering the adjustment of the finger piece 21 for marginal parts of the photograph. The amount of the correction to be applied is a measure of the error due to tilt.

Having thus described my invention what I claim as new and desire to secure by Letters Patent is:—

1. In apparatus for use in the production of maps from pairs of aerial photographs, the combination comprising a stereoscope, a photograph support with means whereby a pair of photographs can be relatively adjusted, the said support being capable of receiving sliding movements in any direction in a horizontal plane, there being stationary reference marks in the stereoscope situated over the photograph support and viewable through the stereoscope, contour plotting mechanism situated beneath the photograph support and capable of receiving sliding movements in any direction in a horizontal plane, and rigid members in pivotal connection with the photograph support, the contour plotting mechanism and a fixed base, the said members determining a pair of relatively inclined and conjointly movable axes which pass through fixed points in said base situated equidistantly from the photographs on vertical axes containing the reference marks, and which also pass through the plumb points on the photographs, substantially as described.

2. In apparatus for use in the production of maps from pairs of aerial photographs, the combination comprising a stereoscope, graticules viewable through the stereoscope, a table on which the photographs can be adjustably mounted, the said table consisting of a pair of parts each carrying a photograph and capable of being moved towards or away from each other, a support on which the table can slide horizontally in either of two directions at right angles to each other, a contour plotting mechanism, a vertically adjustable support on which the said contour mechanism can slide horizontally in either of two directions at right angles to each other, two pairs of rods determining a pair of relatively inclined axes, a fixed base, and swivel connections between the rods and the two parts of the photograph table, the contour plotting mechanism, and the base, and connections between the rods and the contour plotting mechanism which are adjustable in both the horizontal and vertical directions, substantially as described.

In testimony whereof I have signed my name to this specification.

ARTHUR CYRIL WEBB ALDIS.